United States Patent [19]
Gimmler et al.

[11] Patent Number: 6,001,409
[45] Date of Patent: Dec. 14, 1999

[54] MASA CORN-BASED FOOD PRODUCTS AND METHOD OF PREPARING

[75] Inventors: Norbert Gimmler, Ringwood; Joseph A. Szwerc, Mahwah; Juan A. Menjivar, Denville; Craig E. Rethwill, Morris Township; John M. Kaiser, Livingston, all of N.J.

[73] Assignee: Nabisco Technology Company, Wilmington, Del.

[21] Appl. No.: 08/892,989

[22] Filed: Jul. 15, 1997

Related U.S. Application Data

[60] Division of application No. 08/394,071, Feb. 24, 1995, Pat. No. 5,652,010, which is a continuation-in-part of application No. 08/257,814, Jun. 8, 1994, Pat. No. 5,554,405, which is a continuation of application No. 07/848,889, Mar. 10, 1992, Pat. No. 5,320,858, which is a continuation of application No. 07/310,096, Feb. 14, 1989, Pat. No. 5,104,673, which is a continuation of application No. 07/062,673, Jun. 16, 1987, Pat. No. 4,834,996, which is a continuation-in-part of application No. 06/772,918, Sep. 5, 1985, Pat. No. 4,873,093, which is a continuation-in-part of application No. 06/681,647, Dec. 14, 1984, abandoned.

[51] Int. Cl.[6] ..................................................... A23L 1/164
[52] U.S. Cl. ............................ 426/549; 426/560; 426/808
[58] Field of Search .................................. 426/549, 560, 426/508, 523, 804, 808

[56] References Cited

U.S. PATENT DOCUMENTS

| | | |
|---|---|---|
| 678,749 | 7/1901 | Moore et al. . |
| 1,039,912 | 10/1912 | Dollings . |
| 1,169,023 | 1/1916 | Embrey . |
| 1,975,326 | 10/1934 | Loose et al. . |
| 2,204,045 | 6/1940 | Meacham . |
| 2,505,407 | 4/1950 | Johnson . |
| 2,584,893 | 2/1952 | Lloyd et al. . |
| 2,704,257 | 3/1955 | Diez de Sollano et al. . |
| 2,767,667 | 10/1956 | Spooner . |
| 2,823,625 | 2/1958 | Oakes . |
| 2,905,559 | 9/1959 | Anderson et al. . |
| 3,027,258 | 3/1962 | Markakis et al. . |
| 3,089,773 | 5/1963 | Bates et al. . |
| 3,194,664 | 7/1965 | Eytinge . |
| 3,276,397 | 10/1966 | Poppe et al. . |
| 3,278,311 | 10/1966 | Brown et al. . |
| 3,332,781 | 7/1967 | Benson et al. . |
| 3,348,950 | 10/1967 | Weiss . |
| 3,384,495 | 5/1968 | Potter et al. . |
| 3,451,822 | 6/1969 | Fast et al. . |
| 3,493,390 | 2/1970 | Succo . |
| 3,519,432 | 7/1970 | Succo et al. . |
| 3,539,356 | 11/1970 | Benson et al. . |
| 3,545,979 | 12/1970 | Ghafoori . |
| 3,600,193 | 8/1971 | Glabe . |
| 3,615,658 | 10/1971 | Glabe . |
| 3,615,697 | 10/1971 | Hollenbeck . |
| 3,652,294 | 3/1972 | Marotta et al. . |
| 3,690,895 | 9/1972 | Amadon et al. . |
| 3,698,309 | 10/1972 | Steels . |
| 3,698,914 | 10/1972 | Kortschot et al. . |
| 3,698,915 | 10/1972 | Glasgow . |
| 3,753,729 | 8/1973 | Harms et al. . |
| 3,753,735 | 8/1973 | Gerkens . |
| 3,800,050 | 3/1974 | Popel . |
| 3,821,441 | 6/1974 | Tomita et al. . |
| 3,857,982 | 12/1974 | Sevenants . |
| 3,860,735 | 1/1975 | Hoshino . |
| 3,864,505 | 2/1975 | Hunter et al. . |
| 3,873,748 | 3/1975 | Schwab et al. . |
| 3,886,291 | 5/1975 | Willard . |
| 3,922,370 | 11/1975 | Prakash . |
| 3,925,567 | 12/1975 | Abe . |
| 3,935,322 | 1/1976 | Weiss et al. . |
| 3,937,848 | 2/1976 | Campbell et al. . |
| 3,946,116 | 3/1976 | Weaver et al. . |
| 3,956,517 | 5/1976 | Curry et al. . |
| 3,982,032 | 9/1976 | Koizumi . |
| 3,988,875 | 11/1976 | Fay . |
| 3,997,684 | 12/1976 | Willard . |
| 3,998,975 | 12/1976 | Liepa . |

(List continued on next page.)

FOREIGN PATENT DOCUMENTS

| | | |
|---|---|---|
| 637258 | 2/1962 | Canada . |
| 2082602 | 5/1993 | Canada . |
| 0 184 964 | 6/1986 | European Pat. Off. . |

(List continued on next page.)

OTHER PUBLICATIONS

Chemical Abstract #58556d of 17—Foods. vol. 80, 1974.

Tressler, Donald K. Ph.D., Food Products Formulary, vol. 2, Cereals, Baked Goods, Dairy and Egg Products, The AVI Publ. Co., Westport, CT., pp. 103–104 (1975).

"Low–Calorie, Baked Snack . . . 'Potato Pips'", *Engineered Foods Magazine*, p. 58 (Aug. 8, 1984).

(List continued on next page.)

*Primary Examiner*—Arthur L. Corbin

[57] ABSTRACT

Corn-based products having a masa flavor, such as tortilla chips and taco shells, and soft tacos are produced using ground corn. The crisp corn based food products have a masa flavor and color, a crisp texture, and chip-like appearance without the gritty, hard texture associated with conventional tortilla chips or taco shells made by steeping whole corn kernels. The liming of continued corn particles reduces steeping time, develops masa flavor, and reduces tackiness to provide a cohesive dough which can be machined in a tortilla sheeter/cutter. Substantially uniform hydration of a coarse ground corn component, such as corn meal, is achieved by admixing and heating the coarse ground corn component with water and lime to at least substantially hydrate the coarse corn particles without substantially gelatinizing the corn starch. The hydrated coarse component may then be subjected to temperatures above the gelatinization temperature to partially gelatinize the corn starch. A fine ground starchy component is admixed and heated with the hydrated course ground component before, after, or simultaneously with gelatinization of the hydrated coarse ground corn component to form a machinable dough or masa. The hydration process avoids undesirable hard, white, raw-tasting spots in the final product.

12 Claims, No Drawings

U.S. PATENT DOCUMENTS

| | | |
|---|---|---|
| 4,005,139 | 1/1977 | Kortschot . |
| 4,044,166 | 8/1977 | Koizumi . |
| 4,073,958 | 2/1978 | Abe . |
| 4,109,012 | 8/1978 | Bates et al. . |
| 4,109,024 | 8/1978 | Cremer . |
| 4,122,198 | 10/1978 | Wisdom et al. . |
| 4,126,706 | 11/1978 | Hilton . |
| 4,135,004 | 1/1979 | Finkel . |
| 4,140,801 | 2/1979 | Hilton et al. . |
| 4,163,804 | 8/1979 | Meyer et al. . |
| 4,167,588 | 9/1979 | Willard . |
| 4,170,659 | 10/1979 | Totino et al. . |
| 4,208,476 | 6/1980 | Tsao . |
| 4,209,536 | 6/1980 | Dogliotti . |
| 4,238,517 | 12/1980 | Bosley, Jr. et al. . |
| 4,266,920 | 5/1981 | Hayashi et al. . |
| 4,272,554 | 6/1981 | Schroeder et al. . |
| 4,277,510 | 7/1981 | Wicklund et al. . |
| 4,293,582 | 10/1981 | Hamann et al. . |
| 4,312,892 | 1/1982 | Rubio . |
| 4,326,455 | 4/1982 | Rubio . |
| 4,362,754 | 12/1982 | Wenger et al. . |
| 4,409,250 | 10/1983 | Van Hulle et al. . |
| 4,418,088 | 11/1983 | Cantenot . |
| 4,439,459 | 3/1984 | Swartley . |
| 4,446,163 | 5/1984 | Galle et al. . |
| 4,455,321 | 6/1984 | Glabe . |
| 4,505,942 | 3/1985 | Ito et al. . |
| 4,508,739 | 4/1985 | Ryan . |
| 4,517,204 | 5/1985 | Mottur et al. . |
| 4,526,800 | 7/1985 | Howard . |
| 4,528,202 | 7/1985 | Wang et al. . |
| 4,537,786 | 8/1985 | Bernard . |
| 4,555,409 | 11/1985 | Hart . |
| 4,560,569 | 12/1985 | Ivers . |
| 4,567,051 | 1/1986 | Baker et al. . |
| 4,568,557 | 2/1986 | Becker et al. . |
| 4,609,557 | 9/1986 | Mao et al. . |
| 4,613,508 | 9/1986 | Shishido . |
| 4,615,901 | 10/1986 | Yoshioka et al. . |
| 4,623,548 | 11/1986 | Willard . |
| 4,623,550 | 11/1986 | Willard . |
| 4,640,843 | 2/1987 | Matuszak et al. . |
| 4,645,679 | 2/1987 | Lee, III et al. . |
| 4,650,687 | 3/1987 | Willard et al. . |
| 4,749,579 | 6/1988 | Haydock et al. . |
| 4,752,493 | 6/1988 | Moriki . |
| 4,767,633 | 8/1988 | Fowler . |
| 4,769,253 | 9/1988 | Willard . |
| 4,770,891 | 9/1988 | Willard . |
| 4,803,091 | 2/1989 | Mottur et al. . |
| 4,806,377 | 2/1989 | Ellis et al. . |
| 4,834,996 | 5/1989 | Fazzolare et al. . |
| 4,855,151 | 8/1989 | Fielding . |
| 4,861,609 | 8/1989 | Willard et al. . |
| 4,863,750 | 9/1989 | Pawlak et al. . |
| 4,873,093 | 10/1989 | Fazzolare et al. . |
| 4,876,101 | 10/1989 | Willard . |
| 4,879,126 | 11/1989 | Willard et al. . |
| 4,880,371 | 11/1989 | Spinelli et al. . |
| 4,889,733 | 12/1989 | Willard et al. . |
| 4,889,737 | 12/1989 | Willard et al. . |
| 4,929,461 | 5/1990 | Schonauer et al. . |
| 4,931,303 | 6/1990 | Holm et al. . |
| 4,938,982 | 7/1990 | Howard . |
| 4,970,084 | 11/1990 | Pirrotta et al. . |
| 4,985,269 | 1/1991 | Irvin et al. . |
| 4,994,295 | 2/1991 | Holm et al. . |
| 5,000,968 | 3/1991 | Szwerc et al. . |
| 5,015,490 | 5/1991 | Van Lengerich et al. . |
| 5,061,507 | 10/1991 | Aulik et al. . |
| 5,085,884 | 2/1992 | Young et al. . |
| 5,104,673 | 4/1992 | Fazzolare et al. . |
| 5,110,613 | 5/1992 | Brown et al. . |
| 5,147,675 | 9/1992 | Gage et al. . |
| 5,171,600 | 12/1992 | Young et al. . |
| 5,176,931 | 1/1993 | Herbster . |
| 5,188,859 | 2/1993 | Lodge et al. . |
| 5,196,218 | 3/1993 | Schwab et al. . |
| 5,200,222 | 4/1993 | Schwab et al. . |
| 5,320,858 | 6/1994 | Fazzolare et al. . |
| 5,395,637 | 3/1995 | Reec . |
| 5,399,367 | 3/1995 | Mattson . |
| 5,400,704 | 3/1995 | Huston . |
| 5,401,522 | 3/1995 | Reeg . |
| 5,429,834 | 7/1995 | Addesso et al. . |
| 5,447,742 | 9/1995 | Malvido et al. . |
| 5,464,642 | 11/1995 | Villagran et al. . |
| 5,464,643 | 11/1995 | Lodge . |
| 5,500,240 | 3/1996 | Addesso et al. . |
| 5,505,978 | 4/1996 | Roy et al. . |
| 5,532,013 | 7/1996 | Martinez-Bustos et al. . |
| 5,554,405 | 9/1996 | Fazzolare et al. . |
| 5,558,898 | 9/1996 | Sunderland . |
| 5,690,982 | 11/1997 | Fazzolare et al. ...................... 426/550 |
| 5,695,804 | 12/1997 | Hnat et al. ............................. 426/550 |
| 5,747,092 | 5/1998 | Carey et al. ........................... 426/560 |

FOREIGN PATENT DOCUMENTS

| | | |
|---|---|---|
| 2267049 | 11/1975 | France . |
| 2604716 | 8/1976 | Germany . |
| 4137161 A1 | 5/1993 | Germany . |
| 59001786 | 1/1979 | Japan . |
| 5432056 | 10/1979 | Japan . |
| 55-108250 | 8/1980 | Japan . |
| 59-031642 | 2/1984 | Japan . |
| 60-168361 | 8/1985 | Japan . |
| 60-244256 | 12/1985 | Japan . |
| 61-202658 | 9/1986 | Japan . |
| 370933 | 11/1973 | U.S.S.R. . |
| 107218 | of 1917 | United Kingdom . |
| 1525631 | 9/1978 | United Kingdom . |
| 2111816 | 7/1983 | United Kingdom . |

OTHER PUBLICATIONS

Pyler, E.J., "Baking Science and Technology", Siebel Publ. Co., Chicago, IL, 1973, pp. 428–429.

Matz, S.A., *Cookie and Cracker Technology*, The AVI Publ. Co., Chapter 18, pp. 238–253 (1968).

Matz, S.A., *Cookie and Cracker Technology*, The AVI Publ. Co., pp. 265–266 (1968).

Pyler, E.J., *Baking Science & Technology*, Sosland Publishing Co., Merriam, KS, 1988, pp. 1061–1062, 913, and 609.

*Foods and Food Preparation Encyclopedia*, Van Nostrand Reinhold Co., Inc., NY, NY, 1982, pp. 282–284.

Pesrosier, N.W., *Elements of Food Technology*, AVI Publ. Co., Inc., Westport, Conn., 1977, pp. 479–482 and 468–469.

Kotschevar, L.H., *Standards, Principals, and Techniques in Quality Food Production*, Van Nostrad Reinhold, NY, NY, 1988, pp. 404–407.

Whistler, et al., *Starch: Chemistry and Technology*, Academic Press, Inc., pp. 588–590 (1984).

Matz, *Cookie and Cracker Technology*, 2nd ed., The AVI Publ. Co., Inc. (1968), pp. 11–12.

Atwell, et al., "The Terminology and Methodology Associated With Basic Starch Phenomena", *Cereal Food World*, vol. 33, No. 3, 1968, pp. 306–311.

*Food Business Opportunities*, vol. 10, No. 1, 1995, p. 14.

Encyclopedia of Food Technology, vol. 2, pp. 263–267 (1974), The AVI Publishing Company, Inc.

Cerletti, et al., "Maize Germ Proteins, Their Composition, Nutritive Value and Functional Properties", *Proc. Int. Assoc.*

*Cereal Chem. Symp. Amino Acid Composition and Biological Value of Cereal Proteins*, Budapest, Hungary 1983, R. Lasztity, M. Hidvegi, eds.

Molina, et al., "Drum Drying For the Improved Production of Instant Tortilla Flour,", *Journal of Food Science*, vol. 42, No. 6 (1977), pp. 1432–1434.

MASA CORN-BASED FOOD PRODUCTS AND METHOD OF PREPARING

RELATED APPLICATIONS

This application is a divisional of application U.S. Ser. No. 08/394,071, filed Feb. 24, 1995, now U.S. Pat. No. 5,652,010, which is a continuation-in-part application of U.S. Ser. No. 08/257,814, filed Jun. 8, 1994, now U.S. Pat. No. 5,554,405, which is a continuation of U.S. Ser. No. 07/848,889, filed Mar. 10, 1992, now U.S. Pat. No. 5,320,858, which is a continuation of U.S. Ser. No. 07/310,096, filed Feb. 14, 1989, now U.S. Pat. No. 5,104,673, which is a continuation of U.S. Ser. No. 07/062,673, filed Jun. 16, 1987, now U.S. Pat. No. 4,834,996, which is a continuation-in-part of U.S. Ser. No. 06/772,918, filed Sep. 5, 1985, now U.S. Pat. No. 4,873,093, which in turn is a continuation-in-part of U.S. Ser. No. 06/681,647, filed Dec. 14, 1984, now abandoned.

FIELD OF THE INVENTION

This invention relates to the production of masa corn-based products such as tortilla chips, taco shells, corn chips, soft tortillas, and soft tacos using comminuted corn instead of cooked, steeped, whole corn kernels. The corn-based products include reduced fat, low-fat, and no-fat chips, taco shells, soft tortillas, and soft tacos.

BACKGROUND OF THE INVENTION

The production of traditional fried corn snacks generally involves a prolonged steeping step of about 10 to 20 hours. Whole kernels of corn are steeped in a hot lime solution to soften the outer hull and partially gelatinize the starch in the endosperm. The degree of gelatinization is generally about 10%. As disclosed in U.S. Pat. No. 4,645,679 to Lee, III, et al., both white and yellow corn of the dent type are added to a vat containing heated water and a proportionate amount of lime. The mixture is heated to the boiling point, the heat is cut off, and the contents of the vat are allowed to stand undisturbed for 10 to 20 hours. The lime loosens the pericarp from the endosperm so that water can reach the starch and so that the pericarp can be removed. If the pericarp remains, doughs made from the steeped whole grains become excessively sticky. The corn kernels generally have a moisture content of at least about 50% by weight by the end of the steeping step. The heating and steeping steps result in hydration and partial hydrolysis of the corn hulls. The corn hulls are removed from the steeped kernels by washing. The washing may be performed with jets of water which also remove any remaining lime. The washed kernels are then ground in a stone mill into a dough containing about 50% or more moisture, known as masa.

As disclosed in U.S. Pat. No. 4,623,548 to Willard, the masa may be formed into thin pieces by extrusion, and the dough may be permitted to fall directly into hot cooking oil in a deep fat fryer. The oil replaces the water in the product resulting in a fried product having an undesirably high, for example at least 35% by weight, fat content and a hard and brittle texture. In another method, it is disclosed, a similar freshly ground masa is sheeted between rollers, cut into pieces, and baked to reduce the moisture content from about 35% to as low as about 20% before frying. According to U.S. Pat. No. 4,623,548 the dough should have a moisture content of about 50% for effective sheeting. Reducing the moisture content of the baked dough pieces reduces the fat content of the fried product to about 20% to 25%. However, according to U.S. Pat. No. 4,623,528 the fried pieces tend to have an uneven expansion, with large blistered areas and a hard, chewy texture. The same uneven structure, it is disclosed, is also found in the extruded masa-based snacks. Also, as disclosed in U.S. Pat. No. 4,645,679, the conventional process of producing corn chips has the disadvantages of producing chips which are gritty and do not easily melt in the mouth.

In the process of U.S. Pat. No. 4,645,679, hydrated corn having a moisture content of about 30% to about 40% is comminuted, and then admixed with a comminuted hydrated starch material selected from dehydrated potatoes, tapioca starch, corn starch, and mixtures thereof. However, the hydrated corn is still made by cooking raw corn kernels in water and lime, steeping until the hulls are softened, and washing the corn to remove the hulls. In a preferred embodiment the hydrated cut corn having a moisture content between about 30% and 40% is further hydrated by steeping it in water at a temperature of about 150° F. to about 170° F. for about 24 to about 48 hours to obtain a moisture content of about 60% to about 70%.

As disclosed in U.S. Pat. No. 4,623,548, dried masa flour has been used for the production of corn snacks and other Mexican food specialties, such as tortillas and taco shells. The dried masa flour is generally made by grinding the lime-treated corn and then dehydrating it to a stable form. A dried masa flour may then be rehydrated with water to form a dough for extrusion or sheeting. Whole corn kernels may be partially cooked, without lime treatment, that is without removing the outer hull, then dry-milled to obtain partially cooked, dry-milled whole corn flours. Doughs for making a fried snack may be produced by mixing the whole corn flour with water. However, according to U.S. Pat. No. 4,623,548 fried snacks made from whole corn flours are hard and brittle and retain too much fat because of the low water absorption of the flours. In the process of U.S. Pat. No. 4,623,548, extruded expanded fried cereal-based snack products are produced using one or more raw or partially gelatinized cereal flours such as whole corn flour, masa flour, corn flour, barley flour, bulgur flour, cracked bulgur, oat flour, rye flakes, rye flour, and soy flour. The low water-absorbing component is admixed with a high water-absorbing component such as a pregelatinized cereal starch or flour or dehydrated potatoes. In addition, a starch component comprising one or more extraneously added ungelatinized starches is included. The three components, it is disclosed, are critical at the time of frying to obtain a controlled expansion into a well expanded, uniformly porous fried snack which differs from fried corn chips. The high water absorbing component, it is disclosed, retains the water in the formed dough piece as the temperature increases during frying. Sufficient water is therefore present at the gelatinization temperature to allow the other two components to absorb water when the dough reaches the gelatinization temperature and to cause formation of an expanded, uniformly porous fried snack.

U.S. Pat. Nos. 4,873,093 and 4,834,996 to Fazzolare, et al. disclose that the machinability of doughs made from ingredients having little or no gluten may be improved by forming a dough under elevated temperature conditions, such as by steaming the ingredients.

U.S. Pat. Nos. 4,931,303 and 4,994,295 to Holm, et al. disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch) and the concentration of any starch-complexing emulsifiers present. In the Holm, et al. process, a dough may be formed comprising, e.g. potato solids or corn solids, raw or pre-gelatinized starches, modified starches, flavorings, oils, and the like. Dough pieces are subjected to case hardening by direct impingement gas-fired drying ovens, steam-heated conveyer dryers, infrared ovens or microwave ovens to promote surface bubbling during subsequent frying. It is disclosed that doughs containing less than about 30% moisture are generally too dry even after the Holm, et al. drying step to create adequate bubbles. In the Holm, et al. process, substantial moisture reduction of the dough is achieved by frying. During frying, the dough moisture content of about 30% to about 55% is reduced to obtain a fried product with a moisture content of about 1–2%.

German patent publication no. 4,137,161 (published May 13, 1993) to Reeg and corresponding Canadian patent publication no. 2082602 (published May 13, 1993) disclose the preparation of a maize dough for producing snack foods such as tortillas or taco shells by heating a mixture of ground corn, and water to 50–65° C. which is just over the gelling point of the starch. Heating may be applied by friction from the mixing equipment or by passing steam into the mixture. The mixture is cooled while the starch is only partly gelled. The mixing of the ingredients to a homogeneous mass is preferably completed at room temperature. The mixture also contains sufficient calcium hydroxide to give a pH of 9–11.

In the present invention, corn-based products such as tortilla chips, taco shells, corn chips, soft tortillas, and soft tacos are produced using ground corn products thereby eliminating the need for prolonged steeping times associated with the production of fried corn products conventionally made from whole corn kernels. In embodiments of the invention, chip-like snacks having a crisp texture and chip-like appearance are produced from coherent, machinable, sheetable doughs without using a frying step for substantial moisture reduction of the dough thereby resulting in products having low-fat content. The corn based products of the present invention do not possess a gritty, floury, or uncooked after-taste or hard texture. The products possess a masa flavor and appearance which are comparable to those of products made using a traditional steeping process.

SUMMARY OF THE INVENTION

In embodiments of the present invention masa corn-based products such as tortilla chips and taco shells are produced without the need for a lengthy conventional steeping of whole corn kernels. The corn content of the products is generally greater than about 50% by weight, preferably at least about 70% by weight, based upon the total weight of all the starchy materials. The snack chip and taco shell products are crisp but not hard. They possess a masa flavor and an appearance comparable to that of conventionally prepared, fried products. Masa flavored soft tortilla and soft taco shells may also be produced in embodiments of the present invention. The masa corn-based products include reduced-fat, low-fat and no-fat chips and shells.

In the present invention ground corn products rather than whole corn kernels are subjected to liming and hydration to substantially reduce steeping times while avoiding the formation of sticky, non-coherent doughs. In embodiments of the invention, essentially ungelatinized coarse corn particles are at least substantially hydrated in the presence of lime without substantially gelatinizing the starch. The particle distribution of the coarse corn component is generally such that greater than about 75% by weight, preferably greater than about 95% by weight of the particles do not pass through a 40 mesh screen or sieve. The hydration is conducted in the substantial absence of substantially more readily hydratable fine ground starchy materials so as to assure uniform hydration of the coarse ground corn component. The hydrated coarse ground corn component may then be subjected to gelatinization temperatures to partially gelatinize the starch.

The fines, such as corn flour or other starchy materials, are added after hydration of the coarse corn component either before or after initiation of the gelatinization step. The resulting machineable coherent dough or masa may have a degree of gelatinization of about 20% to about 80%, preferably from about 40% to about 60%. The partial gelatinization is preferably achieved by direct steam injection. The steam is injected after hydrating the coarse particles. In embodiments of the invention, the fines may be subjected to steaming or they may be added after steaming.

The fines create a continuous phase which holds the product together and reduces breakage. The coarse particles disturb the continuous phase and avoid excessive blistering and an excessively hard texture. It has been observed that if coarse and very fine particles are mixed in water at the same time, the fine particles instantly soak up most of the water due to their relatively large surface area compared to the surface area of the coarse material. The result is, the coarse particles do not absorb enough free water to hydrate properly in an acceptable time. Insufficient hydration of the coarse corn particles may deleteriously affect sheetability. It may also result in visible, hard, dry or white spots, and raw or uncooked flavor notes in baked, and/or fried products. At least substantially or completely hydrating the coarse corn particles prior to adding the more readily hydratable fine particles avoids these problems.

The coarse ground corn component, such as corn meal or ground whole corn, is allowed to steep in the water with lime for about 10 to 60 minutes, generally for about 20 minutes to about 30 minutes to hydrate properly. The added water should generally not exceed about 160° F., preferably about 150° F., to prevent the corn starch from gelatinizing. The mixture temperature during hydration or steeping should be kept below the gelatinization temperature. The mixture temperature during hydration is preferably from about 120° F. to about 145° F. The required steeping time depends on the granular size of the corn material used. Proper steeping is critical for the quality of the final products. It is very important that the corn material is steeped or hydrated prior to being heated above the gelatinization temperature of corn starch. It has been observed that hydration of partly gelatinized corn material takes substantially longer than hydration of ungelatinized corn material.

After the hydration of the corn material is at least substantially completed it may be heated to a temperature above the gelatinization temperature to partly gelatinize the corn starch. Exemplary temperatures which may be used to achieve partial gelatinization may range from about 160° F. to about 180° F. Heating times at these temperatures are generally at least about 5 minutes, for example, from about 7 minutes to about 15 minutes. This partial gelatinization further increases the water absorption of the corn particles and gives the dough cohesiveness, which makes the dough sheetable using a standard masa sheeter/cutter. In embodiments of the invention, a low shear mixer/heat exchanger is used to gelatinize the starch and form a sheetable dough. It has been found that if the heating during the gelatinization is accompanied by intensive mechanical shear, the dough becomes excessively sticky and unsheetable on a continuous, mass production basis. Oil and/or emulsifiers may be included in the dough to decrease dough stickiness. The sheetable corn-based doughs or masa of the present invention may contain from about 40% by weight to about 60% by weight, preferably from about 45% by weight to about 55% by weight water, based upon the weight of the dough.

The sheetable doughs or masas of the present invention may be produced continuously, semi-continuously, or in batches. In a semi-continuous or in a continuous process a preconditioner may be used for the coarse ground corn hydration. A low shear continuous mixer/heat exchanger or continuous kneader/heat exchanger may be used in the gelatinization step. In the semi-continuous process, the preconditioning can be conducted batch-wise or semi-continuously using a conventional, low speed batch mixer such as a Triumph mixer or a Hobart mixer. The lay time of the dough can take place in a hopper feeding the low shear continuous mixer/heat exchanger or in a dough trough. For a continuous operation a twin screw extruder side feeder or a Moynopump can be used to make the water/coarse corn/lime premix. The premixer may then convey the premix through a low shear mixing device to provide residence time for hydration. The heating and gelatinization of the hydrated coarse corn and the addition of fines and other ingredients can then take place in the low shear continuous mixer/heat exchanger or continuous kneader/heat exchanger. The heating and gelatinization may be conducted either indirectly through heat exchange with the mixer barrel or jacket, or directly through steam injection, or by a combination of direct and indirect heating.

An upright mixer, such as a Triumph mixer or a Hobart mixer, can be used to conduct all process steps in a batch process for making the sheetable masa dough. The preconditioning can be done by mixing and steeping of the coarse corn material in all of the formula water and lime for the time necessary for substantial hydration, for example about 20 to 30 minutes. Then all other ingredients may be added to the mixer and mixed with heating to obtain a cohesive machinable dough. The heating and gelatinization to obtain the cohesive, machinable dough may be performed by direct injection of steam into the mixer.

The masa or dough may be sheeted and cut into pieces using conventional equipment. The dough pieces may be processed further using conventional toasting, baking and/or frying equipment as used for the production of chips and shells from traditional masa.

DETAILED DESCRIPTION OF THE INVENTION

The present invention provides corn based food products having a masa flavor and color, a crisp texture, and chip-like appearance without the gritty, hard texture associated with conventional tortilla chips made by steeping whole corn kernels. The corn-based products of the present invention generally have greater than 50% by weight, preferably at least about 70% by weight, corn, based upon the total weight of the starchy materials. The products may be baked, fried, or a combination thereof. They include corn chips, tortilla chips, taco shells, and other chip-like products, and soft tortillas and tacos. Reduced fat, low-fat, or no-fat corn-based products may be produced in accordance with the present invention.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for chips and taco shells, the reference amount is 30 grams. Thus, the fat content of a low-fat chip, snack, cracker, wafer, or taco shell would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product. A no-fat chip, snack, or wafer having a label serving size of 28 grams would have a fat content of less than 0.5 grams per 28 grams or less than about 1.79% by weight, based upon the weight of the final product.

In the present invention, comminuted corn particles are subjected to liming to reduce steeping time while developing masa flavor. The liming of the particulates also affects starch functionality so as to reduce tackiness and provide a cohesive dough which can be continuously machined in a tortilla sheeter/cutter. Fine ground starchy materials are used to create a continuous phase. Coarse ground corn particles are used to disturb the continuous phase to reduce and control blistering and to provide a crisp chip-like texture and appearance. Use of the coarse particles also helps to reduce hardness, control temperature, and reduce breakage. The coarse ground corn material is preconditioned to hydrate the coarse corn preferably in the substantial or complete absence of the fine cereal grain particles. Separately hydrating the coarse material and the fine material permits a greater degree of hydration of the coarse corn material because it does not have to compete with the higher surface area fine particles for the formula water. Excessive hydration of the fines and insufficient hydration of the coarse material tends to result in a sticky, non-cohesive dough which is difficult to sheet on a continuous basis. It also tends to result in white or raw, hard centers in the coarse particles in the baked product.

The coarse corn particles are hydrated below the gelatinization temperature of the corn starch so as to avoid the formation of a gelatinized skin or outer layer on the large particles. Avoiding the production of an outer gelatinized layer permits penetration of water into the interior of the coarse corn particles. More uniform hydration and a higher degree of hydration is achieved by conducting the hydration and liming at a temperature below the gelatinization temperature of the starch. The temperature of the substantially uniformly hydrated coarse corn particles may then be raised to partially gelatinize the hydrated corn particles. The substantial hydration of the interior of the coarse corn particles and substantial gelatinization of the interior of the particles promotes the attainment of a cohesive, non-sticky dough which is continuously machinable. The fine ground starchy material may be hydrated by admixing with the hydrated coarse corn material either before or after gelatinization of the hydrated coarse corn material. Gelatinization of the fine ground starchy component may occur simultaneously with or subsequent to gelatinization of the coarse corn material.

The degree of gelatinization of the dough formed from the coarse corn material and the ground starchy component may range from about 20% to about 80%, preferably from about 40% to about 60%. After baking and/or frying, the degree of gelatinization is generally greater than about 90%.

Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The point of the initial stage of gelatinization and the range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granule. See Atwell et al, "The Terminology And Methodology Associated With Basic Starch Phenomena," Cereal Foods World, Vol. 33, No. 3, Pgs. 306–311 (March 1988).

The coarse ground corn component is a corn component which is generally too coarse to form a continuous phase or too coarse to continuously form a dough sheet on a conventional masa sheeter. The presence of too high a proportion of fine particles during hydration of the coarse corn component tends to result in starch leakage, and sticky doughs, more blistering and raw notes, or uncooked after taste. The coarse corn component particle size distribution is generally such that greater than about 75% by weight, preferably greater than about 95% by weight, of the particles do not pass through a 40 U.S. mesh screen. A narrow size distribution range, such that the coarse corn particles have a substantially uniform particle size is preferred for more even hydration. For example, in preferred embodiments, the coarse corn component particle size distribution may be such that at least 70% by weight, more preferably at least 90% by weight, of the particles are smaller than 30 U.S. mesh and larger than 40 U.S. mesh.

Exemplary coarse ground corn components which may be used in the present invention are stone-ground, whole corn meal, ground corn or cracked corn, grits, corn germ, flaked corn, degreed corn meal, and mixtures thereof. The preferred coarse ground corn component for use in the present invention is degreed coarse corn meal. The corn may be dent corn, waxy corn, white corn, yellow corn, other colors, and mixtures thereof. Commercially available ungelatinized or essentially ungelatinized coarse corn components may be used.

Stone-ground, whole corn meal and ground corn or cracked corn are coarse corn products obtained by grinding or chopping the entire corn kernel which includes the germ, endosperm, and bran or outer coating or pericarp of the kernel. Flaked corn is cracked corn which is run over flaking rolls.

Corn grits is medium-sized hard flinty ground corn with little or no bran or germ. Exemplary of a corn grit product which may be used is a degreed yellow-corn grit having a sieve analysis of 0% to 7% by weight retained on a 16-mesh U.S. sieve, 85% to 95% by weight retained on a 20-mesh U.S. sieve, 0% to 15% by weight retained on a 25-mesh U.S. sieve, 0% to 3% by weight retained on a 30-mesh U.S. sieve, and a maximum of 2% by weight passing through a 30-mesh U.S. sieve. Another degreed yellow corn grit which may be used may have a sieve analysis of 0% to 0.1% by weight retained on a 12-mesh U. S. sieve, 8% to 22% by weight retained on a 20-mesh U.S. sieve, 75% to 90% by weight retained on a 40-mesh U.S. sieve, and a maximum of 3% by weight passing through a 40-mesh U.S. sieve.

Degreed corn meal (also referred to as corn meal) may be produced by dry milling of corn using a Beall corn degerminator. The Beall degerminator is an attrition device comprising a cone shaped shell rotating around a stationary inert cone. Corn is fed into the smaller end of the cone and works it way down to the large end. The corn is rubbed between the stationary cone and the rotating cone during its passage from one end to the other. The rubbing action dehulls the corn and loosens the germ. Entoleters can also be used for dehulling and degerming. Generally, the whole corn kernels are either dry cleaned or wet cleaned then conditioned. During conditioning, normally the moisture content of the corn is raised to about 21% because if it is too dry it will break into small flour-size pieces during degerming. Following the degerming and the dehulling, the corn is dried so that it can be handled on roller mills and in sieves. The moisture content is generally brought down to about 15% by weight. At this point, the product is generally aspirated to remove the bran and then it is ready for the main part of the milling system.

A milling system comprises grinding, sifting, and classifying, purifying, aspirating, and in some cases, final drying. The fines go to the next break roll and the coarse particles go to purifiers and then to the germ rolls. The normal flow is through break rolls and then to plansifters. The fines go to the next break roll and the coarse particles proceed to purifiers and then to the germ rolls. The germ rolls flatten the germ so that it is easily removed by sifting. The break rolls are followed by reduction rolls which produce the final fine flour. Degreed corn meal is hard, flinty ground corn with little or no bran or germ having a particle size between that of grits and flour.

The fine ground starchy component is generally substantially more readily hydratable than the coarse corn component. It is generally capable of forming a continuous phase or sheetable dough. The particle size distribution of the fine-grained cereal grain component is generally such that at least about 25% by weight of the particles pass through a 40 U.S. mesh screen. Pregelatinized starches are generally more readily hydratable than ungelatinized starches. In embodiments of the invention, pregelatinized starches may be added with the fines even when their particle size distribution is such that less than 25% by weight of the pregelatinized particles pass through a 40 mesh screen.

Generally, the weight ratio of the coarse ground corn component to the fine ground starchy component used in the two step hydration process of the present invention may be from about 0.5 to 4:1, preferably from about 0.8 to 2.5:1.

The fine ground starchy component or the more readily hydratable starchy component used in the present invention may be one or more conventional fine ground starchy materials or ingredients having starch, such as fine ground cereal grains, tubers, roots, or legumes. Commercially available native or modified cereal, root, or leguminous starches, and partially or completely gelatinized starches and ingredients containing them may be used. Preferred fine ground starchy components are degreed corn meal (corn meal), corn flour, oat flour, rice flour, bulgur, and mixtures thereof. Exemplary of other fine ground starchy components which may be used in alternative embodiments are potato flour, masa corn flour, buckwheat flour, barley flour, tapioca, and mixtures thereof. Each of these ingredients, as well as degreed corn meal, corn flour, oat flour, and rice flour, has a high starch content, but is absent of gluten. When mixed with water these ingredients have no elasticity because of their lack of gluten. The inability to stretch makes the wet compositions prepared from these ingredients unsuitable for conventional handling and machining as used in cracker technology.

Non-gluten, fine ground starch-containing ingredients can also be blended with gluten-containing ingredients to vary the flavor and/or texture of the final product. Gluten-containing ingredients which can be used include wheat germ, wheat flour, bulgur, rye flour, sorghum flour, graham flour, and mixtures thereof.

Pregelatinized waxy starches or pregelatinized high amylopectin content starches which may be optionally used in the present invention include pregelatinized waxy maize starch, pregelatinized waxy rice starch, and mixtures thereof. Exemplary of a pregelatinized waxy starch which may be used to promote cohesiveness, dough extensibility, and dough machinability is a modified waxy maize starch such as X-Pand'R starch 287C produced by A.E. Staley Manufacturing Company. The pregelatinized waxy starch may have a moisture content of less than or equal to about 5.5% by weight and a pH of about 5 to about 6. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface.

Exemplary amounts of the optional pregelatinized waxy starch which may be used in embodiments of the present invention may range from about 2% by weight to about 25% by weight, of the coarse ground corn component, such as corn meal.

Any food-grade lime or calcium hydroxide may be used in the present invention. The lime is added in an amount sufficient to improve starch functionality and reduce tackiness of the corn-based dough, and to provide a masa flavor to the final product. Exemplary amounts of lime which may be used in embodiments of the present invention are from about 0.2% by weight to about 3% by weight, preferably from about 0.5% by weight to about 1.5% by weight, based upon the weight of the course ground corn component, such as corn meal.

The amount of water added to produce the machineable doughs of the present invention should generally be sufficient to provide a total moisture content of from about 40% by weight to about 60% by weight, more preferably from about 45% to about 55% by weight, based upon the weight of the dough. In embodiments of the invention, moisture contents of at least about 45% by weight are preferred for developing a three-dimensional configuration, or undulations and blisters in baked and/or fried corn-based products. These moisture contents take into account all sources of moisture in the dough, including separately added water, the moisture content of the ingredients, and the moisture added by any direct steam injection.

All or a portion, for example at least about 45% by weight, of the formula water may be admixed with the course ground corn component to hydrate it prior to addition of the fine ground starchy material. Any remaining formula water may be added with and/or subsequent to the addition of the fines. Generally, the amount of water admixed with the course corn component prior to addition of the fines is at least about 80 parts by weight of water per 100 parts by weight of the coarse corn component. The water may be added in the form of tap water or heated water having a temperature below the gelatinization temperature of the starch.

One or more emulsifiers may be included in the doughs of the present invention to facilitate dough mixing, reduce dough stickiness, and facilitate machining. Exemplary of emulsifiers which may be used are: a) polyoxyethylene sorbitan fatty acid esters, such as polysorbate 60 or polysorbate 80, b) stearoyl lactylates, such as calcium or sodium stearoyl lactylate, c) lecithin, d) mono- and/or di-glycerides, e) sorbitan monostearate, f) diacetyl tartaric acid esters of mono- and diglycerides, or g) mixtures thereof. Preferred emulsifiers for the production of corn-based snacks in accordance with the present invention are sodium stearoyl lactylate, and fluid, unbleached lecithin derived from the phosphatides of phosphalipids of soybean oil. The fluid lecithin is an oil-based flowable liquid at room temperature and typically has a moisture content of less than or equal to about 1% by weight. The optional emulsifiers may be used in amounts which do not adversely affect flavor, appearance or texture. Exemplary amounts of the emulsifiers may range from about 0.1% to about 1.25% by weight, based on the total weight of the coarse ground corn component and the fine ground starchy component.

The corn-based snacks of the present invention may include conventional flavoring and leavening agents. Sugar may be included in the dough in amounts ranging up to about 12% by weight, preferably from about 2% to about 10% by weight, based upon the total weight of the coarse ground corn component and the fine ground starchy component. Salt may be added to the dough in an amount of up to about 3% by weight, based upon the total weight of the coarse ground corn component and the fine ground starchy component.

Exemplary of optional chemical leavening agents or pH-adjusting agents which may be used include alkaline materials and acidic materials such as sodium bicarbonate, ammonium bicarbonate, calcium acid phosphate, calcium acid pyrophosphate, sodium acid pyrophosphate, diammonium phosphate, tartaric acid, mixtures thereof, and the like. Gases injected directly into the dough may also be used as leavening agents in embodiments of the present invention. Exemplary gases which may be injected include carbon dioxide, air, nitrogen, inert gases, and mixtures thereof. Carbon dioxide is a preferred injected leavening gas because of its greater solubility in water and resulting slower release, and more controlled or even expansion. The one or more leavening agents may generally be used in amounts up to about 3% by weight, based upon the total weight of the coarse corn component and other starchy materials.

Conventional snack flavoring ingredients may be blended into the dough composition or sprinkled or otherwise topically applied upon the dough composition before baking or applied to the product after baking. Exemplary flavoring ingredients which may be used include barbecue, sour cream, onion, garlic, bacon, chicken, beef, cheese, ham, peanut butter, nuts and seeds, vanilla, chocolate products, spices, and mixtures thereof.

Corn germ is preferably included in flavor and texture modifying amounts. Corn germ is a by-product of milling corn and imparts a sweet flavor and crunchy texture to starchy snack food products. Exemplary amounts of the corn germ which may be used are up to about 20% by weight, preferably from about 3% by weight to about 10% by weight, of the coarse ground corn component.

Oleaginous compositions which may be used to obtain fried corn-based products, or reduced-fat, or low-fat corn-based baked and/or fried products in accordance with the present invention may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, or non-digestible fats, fat-substitutes, or synthetic fats, such as sucrose polyesters, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise purified soybean oil in which the lecithin has been removed during purification.

The shortening or fat content of the corn-based snacks of the present invention is preferably less than about 20% by weight, more preferably less than about 10% by weight, based upon the weight of the finished product. Generally, the amount of optional shortening or fat used in forming the dough is less than about 5% by weight, preferably less than about 3% by weight, based upon the total weight of the coarse ground corn component and fine ground starchy component. The remainder of any shortening or fat used is generally applied topically to the machined and cut pieces before baking or after baking. The shortening or fat is generally used to modify flavor and texture of the final product.

In embodiments of the invention proteolytic, amylolytic, and pentosanase enzymes may be used to modify viscosity, tackiness, or cohesiveness of the dough, or texture of the final product. Exemplary amounts of the enzyme which may be employed are from 0 to 2% by weight, based upon the total weight of the course ground corn component and fine ground starchy component.

The corn-based products of the present invention are produced by admixing and heating the coarse ground corn component with water and lime to at least substantially or completely hydrate the coarse corn particles at a temperature below the gelatinization temperature of the corn starch. The gelatinization temperature of the corn starch is generally about 65° C. or about 149° F. The added water may be at room temperature, but higher temperatures are preferred to reduce hydration times. Upon mixing with the lower temperature corn, the resulting corn and water mixture or slurry will have a temperature which is below the gelatinization temperature of the corn starch. During this hydration or preconditioning step, the added water temperature should generally not exceed about 160° F., preferably it should not exceed about 150° F., to prevent the corn starch from gelatinizing. Generally, the hydration or preconditioning may be conducted at a mixture or slurry temperature which is from room temperature or about 70° F. to just below the gelatinization temperature (e.g., 149° F.). Higher hydration temperatures are preferred to reduce hydration times. Exemplary mixture or slurry temperatures which achieve rapid hydration without substantial gelatinization are from about 120° F. to about 145° F. External heating may be used to achieve or maintain a desired hydration temperature. In embodiments of the invention, the degree of gelatinization of the corn during hydration or preconditioning may generally be less than about 10%, preferably less than 5%, most preferably essentially zero.

The coarse corn component is allowed to steep in the hot water for a sufficient amount of time to obtain substantial uniform hydration throughout the coarse corn particles. Insufficient hydration generally results in hard, white spots and raw notes in the final product. The required steeping time depends upon the granular size of the corn material used and the water temperature. Generally, the larger the granular size of the particles and the lower the steeping temperature, the longer is the time needed for proper hydration. Exemplary steeping times range from about 10 minutes to about 60 minutes, generally about 20 minutes to about 30 minutes for batch, semi-continuous, or continuous processes.

It is very important that the corn material is steeped prior to being heated above the gelatinization temperature of the corn starch. It has been observed that hydration of partly gelatinized corn material takes substantially longer than hydration of ungelatinized corn material. It is believed that hydration is retarded above the gelatinization temperature due to the formation of a gelatinized skin or outer layer. The gelatinized outer layer retards further penetration of water to the interior of the coarse corn particles. After the hydration or preconditioning, the moisture content of the hydrated coarse corn component may generally be at least about 35% by weight, preferably at least about 40% by weight, based upon the weight of the hydrated coarse corn component.

After the preconditioning or steeping step, the hydrated coarse corn material is heated to a temperature above the gelatinization temperature of the corn starch to substantially partially gelatinize the corn starch. Generally, the coarse corn material is heated above the gelatinization temperature of the corn starch for an amount of time sufficient to achieve a degree of gelatinization of about 20% to about 80%, preferably from about 40% to about 60%. Exemplary heating times to achieve sufficient gelatinization are generally at least about 5 minutes, for example, from about 7 minutes to about 15 minutes. Exemplary temperatures for achieving gelatinization may range from about 160° F. to about 180° F., preferably from about 165° F. to about 175° F. Heating above about 185° F. tends to result in a glassy texture and sheeting and cutting problems. For example, the dough may not release properly from sheeting rolls or the cutter may not cut through the dough. If the gelatinization temperature or time is too low, sheetability may be impaired. Heating the hydrated corn above its gelatinization temperature further increases the water absorption of the corn particles and imparts cohesiveness to the final dough making it sheetable using a standard masa sheeter.

The gelatinization may be accomplished by direct steam injection, by indirect heating or heating jackets, or a combination of direct steam injection and indirect heating. In embodiments of the invention, gelatinization may be performed with essentially no shear, such as by heating the hydrated, limed coarse ground corn component and hydrated fine starchy material in a solid band oven, a microwave oven, an infra-red oven, a drum dryer, or combination thereof. Direct steam injection accompanied by or followed by indirect heating is preferred. Steaming provides a crunchier, less brittle texture, reduced molar packing, and more blisters.

Generally, the steaming process may add about 2% by weight to about 5% by weight or more to the total water content of the final dough. For example, the steaming may increase the water content of the dough by 3% from 49% up to 52% by weight. Prior to gelatinization or steaming, the admixture of total formula water, coarse corn component and lime is slurry-like or liquid. After hydration and gelatinization, the mixture becomes dough-like or paste-like. In embodiments where substantially less than the total amount of water is used in the hydration of the coarse ground corn component, the hydrated corn mixture may be like wetted agglomerates, or a viscous slurry, or paste-like prior to gelatinization.

The finely ground starchy component is not mixed with the coarse ground corn component until after the preconditioning or steeping or hydration of the coarse component. Addition of the finely ground starchy component to the hydrated coarse corn component may be prior to, simultaneously with, or subsequent to, raising the temperature of the hydrated coarse corn component above the gelatinization temperature of the corn starch. Thus, the finely ground starchy component may be admixed with the hydrated coarse component prior to, simultaneously with, or subsequent to, steaming. In each case, the fine ground starchy material is hydrated and partially gelatinized during admixing with the previously hydrated coarse corn component. The hydration and gelatinization of the fine starchy material occurs relatively rapidly because of the small particle size. The fine ground starchy component is hydrated and gelatinized to a sufficient degree to obtain a cohesive, sheetable, cuttable dough. Generally, the hydration and gelatinization are to about the same degree as that of the coarsely ground corn component.

To assure sheetability of the final dough in a masa sheeter, the heating during the hydration or preconditioning step and during the gelatinization step should not be accompanied by intensive mechanical shear or substantial frictional heating. Intensive mechanical shear tends to result in excessively sticky doughs which are difficult to sheet on a continuous mass production basis. Accordingly, heating and mixing is preferably accomplished using a low shear mixer/heat exchanger.

In batch processes, the low shear mixer/heat exchanger may be any conventional low speed upright mixer, horizontal drum mixer, or vertical spindle mixer, such as a Triumph mixer, or Hobart mixer equipped with steam injection nozzles and optional heating jackets.

In semi-continuous processes, preconditioning may be conducted in a batch mixer such as a Triumph mixer, or Hobart mixer, followed by gelatinization in a low shear continuous mixer/heat exchanger. The dough may be permitted to lay in a dough trough or in a hopper feeding the continuous mixer/heat exchanger.

In a continuous process, a low shear twin screw extruder side feeder or Moyno pump may be used to produce the hot water/coarse corn material/lime premix. The premixer may convey the premix through a single or twin screw dough conveyor or open spiral mixer to provide residence time for hydration. The premix may be conveyed into a low shear continuous mixer/heat exchanger or continuous kneader/heat exchanger such as produced by List, Inc., Acton, MA. Heating and gelatinization of the hydrated coarse corn and the addition of the fine ground starchy component and remaining ingredients may occur in the continuous mixer or kneader.

In embodiments where direct steam injection is used in the gelatinization step, the steam may be supplied at a temperature of about 212° F. to about 350° F. Supply pressures may range up to about 125 pounds per square inch. The steaming temperatures and pressures can vary depending on the equipment used. As the steam contacts the colder composition the steam condenses and increases the water content of the composition.

In embodiments where a batch mixer is used to form the sheetable masa dough, it is preferable to admix the fine ground starchy material with the hydrated coarse corn material after the steaming of the coarse corn material. After steaming, the finely ground starchy material may be added with other particulate ingredients such as salt with additional mixing to obtain a substantially homogeneous mixture. Shortening or fat, or oil, and emulsifiers may then be optionally added to the substantially homogeneous mixture to reduce dough stickiness. Mixing may then be continued to obtain a substantially homogeneous sheetable dough. The optional emulsifiers as well as optional enzymes and other ingredients may be added in the preconditioning stage or steeping step.

In embodiments where the dough is produced using a low shear continuous mixer/heat exchanger, or continuous kneader/heat exchanger it is preferable to conduct the steaming after admixing the fine ground starchy component with the hydrated coarse corn component.

In embodiments of the invention, the machinable doughs may have an LFRA value of about 100 grams to about 1200 grams. LFRA is an acronym for Leatherhead Food Research Association, the manufacturer of a texture analyzer. As used herein, it is the resistance to deformation of the dough to a 0.5" diameter ball probe moving at the constant rate of 2 millimeters per second for a set distance of 15 millimeters into the dough.

The finished masa dough or lime-treated corn-based dough may then be transferred by means of conventional conveyor belts to a dough sheeting and cutting operation. In preferred embodiments of the invention, the dough is sheeted using a standard or conventional masa sheeter, such as produced by Casa Herrera. The masa sheeter generally contains a first and a second counterrotating roll or roller. The dough is preferably fed in between the nip of the two rolls by means of a hopper. A first wire which extends the length of the rolls is located against or adjacent to the first roll below the nip of the rolls. The first wire removes and guides the resulting dough sheet away from the first roll and towards the second roll. The second roll serves as a support or base for cutting of the dough into pieces. A rotary cutter having cup-like cutting elements mounted on a third roll is generally located below the counterrotating first and second rollers. The cutter counterrotates with respect to the second roller for cutting the dough sheet into pieces as it passes between the second roller and the cutting roller. A rotating brush may be used for continuous cleaning of the rotating cutter. A second wire which extends the length of the second roller is placed against or adjacent the roller for scraping off or removing the cut pieces from the second roller. The remaining or scrap portion of the dough sheet adheres to the second roller after removal of the cut pieces and is recycled to the nip between the two counterrotating first and second rollers.

In embodiments of the invention, the cutter cups may optionally contain docker pins for dockering or piercing of each piece as it is cut from the dough sheet. Each dough piece may contain from about 3 to about 6 docker holes. Dockering decreases the occurrence of "checking" or the formation of undesirable stress lines that cause breakage in the final product.

The cut pieces which are scraped off by the second wire are permitted to fall onto a conveyor belt for substantial moisture reduction by toasting and baking and/or frying. The dough sheet and dough pieces generally have a thickness of about 1/32" to about 1/16". The cut dough pieces may be triangular, rectangular, wave-like, or circular in shape, or shaped in any other desirable configuration.

Machining may also include the processes used in standard cracker technology. For example, the corn-based dough may be formed into a sheet by gauge or reduction rollers and then optionally be fed to a dough laminating machine. The laminating operation can be performed by overlapping lamina of about one-fourth inch thickness each such that one sheet is placed upon another. Typically, between 3 to 6 laminae are layered together during this operation. The laminate may be formed by folding the sheeted dough upon itself. Separate dough sheets may also be used to form a laminate.

The laminated dough-like composition may then be reduced in thickness. Reduction of the dough mass is generally performed in stages. For example, after three laminae are formed into a sheet, the sheet may then be compressed to about one-sixteenth inch. For four laminae, the dough sheet may first be reduced in thickness to about ½" and then to about ¼". In either case, a final reduction in thickness may be performed by a gauge roller. The dough is generally reduced during this operation to a final thickness of about 1/32 of an inch. At this point, the sheet generally has a width to thickness ratio of at least about 350.

The dough may also be formed into a sheet by extrusion through an extruder sheeting die. The die may be fed by the discharge screw or screws of a List, Inc. continuous kneader/heat exchanger.

The machined dough-like composition may then be cut into dough pieces by a reciprocating cutter, a rotary cutter, or other dough cutting mechanisms. Dockering or piercing the uncut sheet or cut pieces can optionally be included in the machining operation.

The dough sheeting, cutting, and optional dockering operations may occur at substantially the same moisture content of the dough or masa produced in the mixer. The dough produced in the mixer may be permitted to lay and cool or it may be sent immediately to the dough sheeting and cutting operation. Exemplary lay times may range up to about 60 minutes. Dough temperatures upon sheeting should be consistently the same temperature for continuous operation. The dough temperature during sheeting may range from about room temperature or about 70° F. to about 180° F., and is preferably about 100° F. to about 150° F. The dough pieces upon entering a toasting oven prior to baking, or upon entering a fryer may have a moisture content substantially the same and within substantially the same ranges as the dough which is sheeted.

In preferred embodiments, the dough pieces are transferred from the sheeter/cutter into a toaster. Toasting is preferred prior to baking or frying, or prior to a combination of baking and frying. The dough pieces are preferably transported through the toaster and through a baking oven by means of open weaved belts. The open weave permits both top and bottom direct heating for imparting toast marks on both surfaces and a three-dimensional character or undulations to the baked product. The toasting may be performed in conventional toasting ovens such as a Mega Series Corn Oven sold by Lawrence Equipment, South El Monte, Calif., or by the use of direct flame impingement upon the bottoms and optionally the tops of the pieces. Baking ovens equipped with a toasting section may also be utilized. Infrared heaters may also be used in the toasting operation. The toasting operation is generally conducted to reduce the moisture content of the pieces by at least about 10% by weight. The moisture content of the dough pieces may be reduced, for example, from above about 40% by weight down to about 30% by weight to about 35% by weight during toasting. Flavor, and surface coloring or toast marks are developed during toasting. The toasting also helps to form a skin which retards the escape of water during the subsequent baking step. Skin formation helps to promote the development of a blistered surface and a three-dimensional undulated configuration. Exemplary toasting temperatures and times may range from about 220° F. to about 650° F. for about 0.5 minutes to about 4 minutes.

After toasting the toasted pieces may be subjected to further substantial moisture reduction and baking in a direct gas-fired oven, a hot air impingement oven, a forced air convection oven, an indirect radiation oven, an infra-red oven, a microwave oven, or a combination thereof. The baking and drying occurring in the oven generally reduces the moisture content of the toasted pieces from above or equal to about 30% by weight down to less than about 4% by weight, preferably less than about 2% by weight in the production of chips and taco shells. Soft tortilla and soft tacos may be baked to higher moisture contents, of for example, up to about 9% by weight, and shelf stable water activities of less than about 0.7.

Conventional direct gas-fired band ovens having a plurality of temperature zones, conventional hot-air impingement ovens, or other conventional ovens may be used for baking and drying of the toasted pieces. Hot air impingement ovens or forced air convection ovens are preferred for reduced baking times. A commercially available hot air impingement oven which may be used is manufactured by Werner & Pfleider, Ramsey, New Jersey, or APV Baker, Inc. of Grand Rapids, Mich. Baking is preferably performed on a Continental weave band which provides an open weave or mesh. Top and bottom hot air impingement is preferred because it promotes more rapid baking and helps to develop more even color on both sides of the pieces. In addition, the formation of undulations or waves in a direction transverse to the surface of the belt is promoted by top and bottom heating using an open weave band.

The substantial reduction of the moisture content of the dough pieces in the baking oven causes the formation of undulations or curled configurations having blisters substantially throughout the surfaces of the baked piece. In addition, the substantial reduction in moisture content substantially reduces checking of the final product. Upon exiting the oven, such as a gas-fired band oven, hot air impingement oven, or forced air convection oven, the baked pieces may have a temperature of about 212° F. to about 250° F. Exemplary baking temperatures range from about 220° F. to about 650° F. Baking times may range from about 1 minute to about 5 minutes. The fast application of higher temperatures yields a rapid formation of steam within the dough pieces. Steam, present within the pieces, gives rise to blister formations as the pieces are being baked. The exterior portions of the pieces dry rapidly and trap steam formed in the internal portion of the pieces. As the steam forms under an external layer, it performs a function similar to the leavening agent and causes expansion and undulation of the dough-like composition.

After baking in the oven, such as a gas-fired oven or hot air impingement oven, the dough pieces are optionally further dried by dielectric energy application to disperse the moisture present within the piece and decrease its total moisture. In producing products which contain a source of potato starch, the dielectric heating step is preferred. The dielectric heating may be used to reduce the moisture content to a level which is from about 0.5% to about 1% by weight lower. For example, if the moisture content leaving the gas-fired oven is 2.5% by weight, the dielectric heating may be used to reduce the moisture content of the pieces to about 1.5% by weight to about 2% by weight. The dielectric heating tends to remove moisture from the areas of the dough piece having a higher moisture content thereby reducing moisture gradients within the piece which tend to cause checking.

In embodiments, of the invention, the baked pieces or the optionally dielectrically treated pieces may be sprayed with oil or an edible no-fat, low-fat or reduced fat edible adhesive. The oil or adhesive is used to increase palatability and to provide a medium for the adhesion of seasoning ingredients. The seasoning ingredients may be applied after spray coating with the oil or adhesive or they may be applied together, for example, as a slurry. A slurry coating applicator such as a Coatronic applicator sold by Allen International, Newberg, Ore., or a rotating disk applicator such as sold by Arcall Ltd., Dorset, England, may be used. The pieces may be subjected to tumbling during the spraying and/or during the addition of particulate seasoning ingredients.

In embodiments of the invention, the baked and optionally dielectrically heated pieces may be further subjected to moisture equilibration in an annealing tunnel at temperatures of from about 140° F. to about 180° F. Moisture reduction during annealing may range from about 0.2% to about 0.5% by weight. The annealing step may help to further reduce checking.

A drying tunnel which uses low velocity, low temperature air drying, such as produced by Aeroglide of Raleigh, N.C., may be used in embodiments of the invention to dry the baked pieces before or after seasoning application. Air drying temperatures may range from about 100° F. to about 200° F., with moisture reductions ranging from about 0.7% by weight to about 2.2% by weight.

The moisture content of the products upon packaging is preferably from about 0.8% to about 3% by weight, more preferably from about 1% to about 2% by weight for crisp or chip-like snacks. Soft tacos and soft tortillas may have water contents of up to about 9% by weight. The products are preferably packaged in vapor-proof packaging materials and have shelf stable water activities of less than about 0.7. The bulk density of the crisp snack products of the present invention may range from about 1.0 to about 3.0 lbs. per cubic foot. The products of the present invention may contain the coarse corn component such as corn meal, and the fine starchy component such as corn flour or other no- or low-gluten content starchy material in a total amount of at least 65% by weight, based upon the weight of the final product or chip.

In taco shell production, the generally circular dough pieces may be folded into a wedge and then toasted, baked and/or fried while being held in wedge-shaped forming members to obtain a wedge-shaped taco shell.

Fried products, such as corn chips, taco shells or tortilla chips may be produced by frying the pieces in a conventional corn chip, taco or tortilla frier such as disclosed in U.S. Pat. No. 3,946,655. The frying of the dough pieces may be performed without or in combination with toasting and baking. Reducing the moisture content of the pieces by toasting and/or baking prior to frying is preferred so as to reduce the total fat content of the final product. For example, in embodiments of the present invention, the dough pieces, after having their moisture content reduced to less than about 38%, preferably less than about 10%, most preferably less than about 5% by weight by heating in air, may be subjected to frying. The combination of air heating and frying helps to enhance flavor while keeping the fat or oil content of the final product low. The heating in air may, for example, be performed in a toasting oven, direct gas-fired oven or hot air impingement oven, forced air convection oven, or combinations thereof. In embodiments of the invention, the corn-based chips or taco shells may have a shortening or fat content of less than about 20% by weight, preferably less than about 10% by weight.

The following examples illustrate the present invention wherein all parts, percentages, and ratios are by weight, and all temperatures are in ° F. unless indicated to the contrary:

EXAMPLE 1

The ingredients and their relative amounts which may be used to prepare a cohesive, machineable dough for producing a low-fat content corn-based snack having a blistered, undulating, tortilla-chip like appearance and limed flavor, and a chip-like texture are:

| INGREDIENTS | WEIGHT % BASED ON TOTAL DOUGH | PARTS BY WEIGHT |
| --- | --- | --- |
| STAGE 1 | | |
| Coarse corn meal (about 10% by weight water) | 24.770 | 50.00 |
| Corn germ (about 10% by weight water) | 1.486 | 3.00 |
| Sodium stearoyl lactylate | 0.218 | 0.44 |
| Lime | 0.248 | 0.50 |
| Water | 42.110 | 85.00 |
| Proteolytic enzyme | 0.002 | 0.004 |
| STAGE 2 | | |
| Steam (as condensate) | 4.786 | 9.66 |
| STAGE 3 | | |
| Fine corn meal (about 10% by weight water) | 24.77 | 50.00 |
| Salt | 0.495 | 1.00 |
| STAGE 4 | | |
| Shortening | 0.991 | 2.00 |
| Fluid lecithin, unbleached | 0.124 | 0.25 |
| Total | 100.0 | 201.854 |

The coarse corn meal may be an unlimited, ungelatinized (as determined by differential scanning calorimetry) degreed corn meal produced by Lauhoff. The particle size distribution of the coarse corn meal may be about 0.12% retained on a 20-mesh U.S. screen, about 65.21% by weight retained on a 30-mesh U.S. screen, about 34.55% by weight retained on a 40-mesh U.S. screen, and about 0.12% by weight passing through a 40-mesh U.S. screen.

The fine corn meal may be an unlimited, ungelatinized (as determined by differential scanning calorimetry) degreed corn meal produced by J. R. Short Milling Co., Kankakee, Ill. The fine corn meal may have a particle size distribution of about 22.44% by weight retained on a 30-mesh U.S. screen, about 4.71% by weight retained on a 40-mesh U.S. screen, about 45.25% by weight retained on a 60-mesh U.S. screen, about 13.12% by weight retained on an 80-mesh U.S. screen, and about 14.48% by weight passing through an 80-mesh screen.

The corn germ may be a coarse flake product having a particle size distribution of about less than 8% by weight retained on a U.S. #8 screen and a maximum of about 27% by weight passing through a U.S. #20 screen.

The fluid lecithin may be an unbleached lecithin derived from the phosphatides of phospholipids of soybean oil. It may be an oil-based product which is pourable at room temperatures. It's Brookfield viscosity at 77° F. may be about 5500 (+/−200) cps. The moisture content of the fluid lecithin may be less than or equal to 1% by weight and its acetone insoluble matter (phosphatides) may be at least 62% by weight. The hexane-soluble matter may be up to 0.3% by weight.

In Stage 1, the coarse corn meal and the corn germ may be blended in an upright dough mixer. The sodium stearoyl lactylate and the lime, each dissolved in a portion of the water may then be added to the mixer and blended. The remaining water preheated to about 150° F. and the proteolytic enzyme may then be added to the mixer and mixed about 2 minutes to obtain a substantially homogeneous slurry-like mixture. The slurry-like mixture may be permitted to soak or steep at a temperature of about 130° F. to about 135° F. for about 30 minutes to at least substantially hydrate the coarse corn meal and corn germ.

In the second stage, the steam may then be turned on with gentle mixing of the slurry-like mixture. The steaming and mixing may be conducted at a steam pressure of about 75 psi and steam temperature of about 284° F. (140° C.) for about 5 minutes to substantially gelatinize the corn starch in the coarse meal. The temperature of the mixture during steaming may be from about 175° F. to about 180° F. In the steaming stage, the amount of steam injected into the mixer is sufficient to provide about 9.66 lbs. of condensate per 50 lbs. of coarse corn meal. The steaming and mixing increases the viscosity and consistency of the slurry-like mixture to obtain a substantially homogeneous paste-like composition.

In the third stage, the fine corn meal and salt may be added to the paste-like steamed mixture. Gentle mixing may be continued for about two minutes without steaming to hydrate the fine corn meal and to partially gelatinize the fine corn meal.

In the fourth stage, the shortening and lecithin may be added to the dough mixer. The ingredients may be gently mixed at about 150° F. to about 155° F. for about two minutes to uniformly hydrate and partially gelatinize the fine corn meal and obtain a substantially homogeneous dough-like mixture or masa having a final temperature of about 150° F. On a calculated basis, the moisture content of the cohesive, homogeneous machinable dough (which includes the moisture present in the ingredients as well as the added water of Stages 1 and 2) is about 52% by weight, based upon the total weight of the dough or masa. The dough may then be transferred, while hot, to a conventional masa sheeter/cutter, such as produced by Casa Herrera.

The dough may be sheeted and then cut into circular shaped pieces with docker holes by the masa sheeter/cutter. The scrap is removed and recycled and the pieces may then be conveyed through a conventional gas-fired toasting oven having an open weave belt. Upon entry into the toasting oven, the dough pieces still have a moisture content of about 52% by weight. The toasting oven temperature may range from about 220° F. to about 475° F. and the toasting time may range from about 1 minute to about 2 minutes. The moisture content of the pieces may be reduced in the toasting oven to a moisture content of about 38% by weight upon exiting the toasting oven. The exiting pieces may have toast marks on both upper and lower surfaces and a slightly blistered undulating appearance.

The thus toasted product may then be transferred to a conventional topping salt applicator. The salted pieces may then be transferred to a conventional direct gas-fired band oven, having a plurality of temperature zones for baking and drying. The oven may be equipped with an open weave oven band or belt for top and bottom heating of the pieces. In the direct gas-fired oven the moisture content of the pieces may be reduced from an entry moisture content of about 38% by weight down to an exit moisture content of less than about 3% by weight. The band oven temperatures may range from about 220° F. to about 650° F. and the baking time may range from about 3.25 minutes to about 3.75 minutes to obtain baked pieces having a toasted, tortilla chip color and a blistered undulating, chip-like appearance.

The baked product may then be transferred to a dielectric oven which may reduce the moisture content of the pieces by about 1%, that is to a moisture content of less than or equal to about 2% by weight.

The pieces may then be transferred to a tunnel where they may be sprayed with oil. The sprayed product may then be transferred to an annealing tunnel to equilibrate its moisture and to reduce the moisture content by about 0.2% to about 0.4%, that is to a moisture content of less than about 1.8%. Upon exiting the annealing tunnel, the temperature may be about 165° F. The annealed product may then be transferred to a tumbler for the addition of particulate seasoning ingredients. The seasoned product may then be transferred to a packaging operation for packaging in moisture proof bags. The final oil-sprayed product may have an oil content of about 15.7% to about 19.6% by weight, based upon the weight of the final product.

EXAMPLE 2

A tortilla chip-like product may be produced as in Example 1 except the moisture content of the dough pieces may be reduced to less than about 5% by weight in the gas-fired oven and then the dough pieces may be fried in a conventional fryer to obtain a crisp tortilla chip-like product having an oil content of less than about 20% by weight.

EXAMPLE 3

The ingredients and their relative amounts which may be used to prepare a cohesive, machineable dough for producing a low-fat content corn-based multi-grain snack having a blistered, undulating, tortilla-chip like appearance and limed flavor, and a chip-like texture are:

| INGREDIENT | WEIGHT % BASED ON TOTAL DOUGH | PARTS BY WEIGHT |
|---|---|---|
| STAGE 1 | | |
| Coarse corn meal (about 10% by weight water) | 34.631 | 70.00 |
| Malt syrup (about 32% by weight water) | 0.247 | 0.50 |
| Lime | 0.247 | 0.50 |
| Water | 39.578 | 80.00 |
| STAGE 2 | | |
| Steam (as condensate) | 6.679 | 13.50 |
| STAGE 3 | | |
| Sucrose | 1.979 | 4.00 |
| Salt | 0.495 | 1.00 |
| Rice flour (about 10% by weight water) | 2.474 | 5.00 |
| Oat flour (about 10% by weight water) | 2.474 | 5.00 |
| Bulgur coarse #1 (about 10% by weight water) | 9.895 | 20.00 |
| STAGE 4 | | |
| Shortening | 0.989 | 2.00 |
| Sodium stearoyl lactylate | 0.188 | 0.38 |
| Fluid lecithin, unbleached of Example 1 | 0.124 | 0.25 |
| Total | 100.0 | 202.13 |

The coarse corn meal may be an unlimited, ungelatinized (as determined by differential scanning calorimetry) corn meal produced by J. R. Short Milling Co., Kankakee, Ill. The particle size distribution of the coarse corn meal may be about 2% by weight maximum retained on a 20-mesh U.S. standard screen, about 18% by weight maximum retained on a 25-mesh U.S. screen, about 25% by weight to about 50% by weight retained on a 30-mesh U.S. screen, about 30% by weight to about 65% by weight retained on a 40-mesh U.S. screen, about 5% by weight maximum retained on a 50-mesh U.S. screen, and about 2% by weight maximum passing through a 50-mesh U.S. screen.

The rice flour may be an unlimited, ungelatinized rice flour as determined by differential scanning calorimetry. The rice flour may have a particle size distribution of about 5% by weight maximum retained on a 35-mesh U.S. screen, and about 95% by weight passing through a 35-mesh U.S. screen.

The oat flour may be an unlimited, ungelatinized oat flour as determined by differential scanning calorimetry. The oat flour may have a particle size distribution of about 5% by weight maximum retained on a 35-mesh U.S. screen, and about 95% by weight passing through a 35-mesh U.S. screen.

The coarse bulgur may be an unlimed bulgur, which is a gelatinized product as determined by differential scanning calorimetry. The bulgur may have a particle size distribution of about 53% by weight retained on a 16-mesh U.S. screen, about 31% by weight retained on a 20-mesh U.S. screen, and about 16% by weight passing through a 20-mesh U.S. screen.

In Stage 1, the coarse corn meal, malt syrup, lime, and water preheated to about 150° F. may be added to an upright dough mixer. The slurry-like mixture may be permitted to soak or steep at a temperature of about 125° F. to about 130° F. for about 35 minutes to at least substantially hydrate the coarse corn meal.

In the second stage, the steam may then be turned on with gentle mixing of the slurry-like mixture. The steaming and mixing may be conducted at a steam pressure of about 75 psi and a steam temperature of about 284° F. (140° C.) for about 7 minutes to substantially gelatinize the corn starch in the coarse corn meal. The temperature of the mixture during steaming may be about 175° F. to about 180° F. In the steaming stage, the amount of steam injected into the mixer is sufficient to provide about 13.5 lbs. of condensate per 70 lbs. of coarse corn meal. The steaming and mixing increases the viscosity and consistency of the slurry-like mixture to obtain a substantially homogeneous paste-like composition.

In the third stage, the sucrose, salt, rice flour, oat flour, and bulgur may be added to the paste-like steamed mixture. Gentle mixing may be continued for about two minutes without steaming to hydrate and to partially gelatinize the rice flour, oat flour, and bulgur.

In the fourth stage, the sodium stearoyl lactylate dissolved in the shortening may be added with the lecithin to the dough mixer. The ingredients may be gently mixed at about 150° F. to about 155° F. for about two minutes to uniformly hydrate and partially gelatinize the rice flour, oat flour, and bulgur and obtain a substantially homogeneous dough-like mixture having a final temperature of about 150° F. On a calculated basis, the moisture content of the cohesive, homogeneous machinable dough (which includes the moisture present in the ingredients as well as the added water of Stages 1 and 2) is about 51.3% by weight, based upon the total weight of the dough. The dough may then be transferred, while hot, to a conventional masa sheeter/cutter, such as produced by Casa Herrera.

The dough may be sheeted and then cut into circular shaped pieces with docker holes by the masa sheeter/cutter. The pieces may then be toasted, salted, baked, subjected to dielectrical heating, sprayed with oil, annealed, seasoned, and packaged as in Example 1.

EXAMPLE 4

A tortilla chip-like product may be produced as in Example 1 except the moisture content of the toasted dough pieces may be reduced from 38% by weight to less than about 2% by weight in a direct hot air impingement oven such as manufactured by APV Baker, Inc. instead of the direct gas-fired oven. The baking time in the hot air impingement oven may be about 2.25 minutes to about 2.75 minutes at a temperature of about 525° F. to about 600° F.

EXAMPLE 5

Dough pieces having a moisture content of about 52% by weight may be produced as in Example 1. The moisture content of the dough pieces may be reduced from about 52% by weight to about 35% by weight by toasting and then to less than about 2% by weight by frying in a conventional tortilla fryer to obtain a fried tortilla chip.

EXAMPLE 6

The ingredients and their relative amounts which may be used to prepare a cohesive, machineable dough for producing a low-fat content corn-based snack having a blistered, undulating, tortilla-chip like appearance and limed flavor, and a chip-like texture are:

| INGREDIENT | WEIGHT % BASED ON TOTAL DOUGH | PARTS BY WEIGHT |
| --- | --- | --- |
| STAGE 1 | | |
| Coarse corn meal (about 10% by weight water) of Example 1 | 25.642 | 50.00 |
| Corn germ (about 10% by weight water) of Example 1 | 1.538 | 3.00 |
| Lime | 0.256 | 0.50 |
| Water | 20.513 | 40.00 |
| Salt | 0.256 | 0.50 |
| STAGE 2 | | |
| Fine corn meal (about 10% by weight water) of Example 1 | 25.642 | 50.00 |
| Water | 23.077 | 45.00 |
| STAGE 3 | | |
| Steam (as condensate) | 1.538 | 3.00 |
| STAGE 4 | | |
| Shortening | 1.179 | 2.30 |
| Sodium stearoyl lactylate | 0.205 | 0.40 |
| Fluid lecithin, unbleached of Example 1 | 0.154 | 0.30 |
| Total | 100.0 | 195.00 |

In Stage 1, the coarse corn meal, the corn germ, lime, salt, and water preheated to 150° F. may be added to an upright dough mixer. The slurry-like mixture may be gently mixed and permitted to soak or steep at a temperature of about 130° F. to about 135° F. for about 20 minutes to at least substantially uniformly hydrate the coarse corn meal and corn germ and obtain a wetted finely agglomerated mixture.

For the second mixing stage, the agglomerated mixture may then be continuously metered into the upstream inlet of a low shear, counterrotating twin screw continuous mixer/kneader such as manufactured by List, Inc. The screws may be equipped with hook-like elements for gentle mixing and conveying of the ingredients. The jacketed barrels and the rotary shafts may be heated by an ethylene glycol heating medium. The fine corn meal and the second stage 150° F. preheated water may be separately continuously metered into the upstream end of the continuous mixer/kneader for admixing and heating with the hydrated, agglomerated mixture at a temperature of about 130° F. to about 135° F. The fine corn meal is at least partially hydrated by contact and mixing with the agglomerated mixture and the second stage preheated water. Mixing, and conveying may be continued to further hydrate the fine corn meal and to obtain a substantially homogeneous paste-like mixture.

In the third stage, steam may be continuously injected into the mixture via a plurality of downstream steam injection ports for simultaneous gelatinization of the hydrated coarse corn meal and hydrated fine corn meal. The steaming and mixing and kneading may be conducted at a steam pressure of about 75 psi and a steam temperature of about 284° F. (140° C.) to substantially gelatinize the corn starch in the coarse meal and in the fine corn meal. The temperature of the mixture during steaming may be from about 175° F. to about 180° F. The residence time of the ingredients in the steaming and gelatinization section may be about 5 to 6 minutes. The amount of steam injected into the mixer may be sufficient to provide about 3 lbs. of condensate per 100 lbs. of the coarse corn meal and coarse corn meal components. The steaming and mixing and kneading increases the viscosity and consistency of the paste-like mixture.

In the fourth stage, the shortening, sodium stearoyl lactylate, and lecithin may be added as a premix to the continuous mixer/kneader downstream of the steam injection zone. The ingredients may be gently mixed and kneaded at about 175° F. to about 180° F. for a residence time of about two minutes to further partially gelatinize the corn starch in the fine and coarse corn meals and to reduce stickiness. The resulting substantially homogeneous, coherent dough-like mixture or masa may have a final temperature of about 167° F. to about 172° F. and a degree of gelatinization of about 40% to about 50% upon discharge from the continuous mixer/kneader. On a calculated basis, the moisture content of the cohesive, homogeneous machinable dough (which includes the moisture present in the ingredients as well as the added water of Stages 1, 2 and 3) is about 50.5% by weight, based upon the total weight of the dough or masa.

A counterrotating twin screw vertical discharge mounted transversely to the continuous mixer shafts may be used to discharge the dough. The dough may then be transferred, while hot, to a conventional masa sheeter/cutter, such as produced by Casa Herrera. The dough may be sheeted at a moisture content of about 48% by weight and then cut into circular shaped pieces with docker holes by the masa sheeter/cutter. The pieces may then be toasted, in a direct fired gas toasting oven to reduce the moisture content of the pieces to about 38% by weight. The pieces may then be baked in a hot air impingement oven as a monolayer at temperatures of about 550° F. to about 600° F. to a moisture content of about 2% by weight to about 3% by weight. The pieces may then be dried in an Aeroglide post-conditioner at about 200° F. to a moisture content of less than about 2% by weight. The dried product may then be transferred to a tumbler for the topical application of a slurry comprising oil and seasoning. The seasoned product may then be transferred to a packaging operation for packaging in moisture proof bags. The final seasoned product may have a shortening or fat content of less than about 15% by weight based upon the weight of the final product.

EXAMPLE 7

A tortilla chip-like product may be produced as in Example 6 except in stage 1 the water, salt, and lime may be premixed in a batch mixer. The premix, the coarse corn meal and the corn germ may be continuously fed to a preconditioning screw conveyor or a continuous mixer instead of to the upright batch mixer of Example 6. The ingredients may be continuously added to the continuous mixer to continuously hydrate and continuously lime the coarse corn meal to obtain a hydrated agglomerated mixture. The hydrated mixture may be continuously fed to an upstream side port of the List, Inc. continuous mixer/kneader. The stage 2 mixing with the fine corn meal and water, followed by the downstream Stage 3 steam injection and gelatinization, and the Stage 4 oil/lecithin/sodium stearoyl lactylate premix addition may proceed as in Example 6.

What is claimed is:

1. A baked masa corn-based chip comprising a limed coarse ground corn component, which has been prepared by admixing and heating a coarse ground corn component with water and lime to hydrate the coarse ground corn component at a temperature below the gelatinization temperature of corn starch, a fine ground starchy component which is admixed with the limed coarse ground corn component, and less than about 20% by weight shortening or fat, the degree of starch gelatinization of the dough from which the chip is baked being from about 40% to about 60%, the total amount of said coarse corn component and said fine starchy component being at least about 65% by weight, said weight percentages being based upon the weight of the chip, said chip having a tortilla chip-like appearance and a crispy texture wherein visible, hard, white spots in the chip are not present.

2. A baked corn-based chip as claimed in claim 1 wherein said limed coarse corn component is limed corn meal and said fine starchy component is fine corn meal.

3. A baked corn-based chip as claimed in claim 1 wherein said limed coarse corn component is limed corn meal and said fine starchy component is at least one member selected from the group consisting of fine corn meal, corn flour, oat flour, rice flour, and bulgur.

4. A baked corn-based chip as claimed in claim 1 wherein the weight ratio of said coarse component to said fine starchy component is from about 0.5:1 to about 4:1.

5. A baked corn-based chip as claimed in claim 4 wherein the shortening or fat content of the chip is less than about 10% by weight, based upon the weight of the chip.

6. A baked corn-based chip as claimed in claim 1 which is a low-fat chip.

7. A baked corn-based chip as claimed in claim 1 which is a no-fat chip.

8. A baked corn-based chip as claimed in claim 1 wherein said limed coarse ground corn component has a particle size distribution of greater than about 75% by weight retained on a 40 U.S. mesh screen, and said fine ground starchy component has a particle size distribution of at least about 25% by weight passing through a 40 U.S. mesh screen.

9. A baked corn-based chip as claimed in claim 8 wherein the degree of starch gelatinization of the baked corn-based chip is greater than about 90%.

10. A baked taco shell comprising a limed coarse ground corn component, which has been prepared by admixing aid heating a coarse ground corn component with water and lime to hydrate the coarse ground corn component at a temperature below the gelatinization temperature of corn starch, a fine ground starchy component which is admixed with the limed coarse ground corn component, and less than about 20% by weight shortening or fat, the degree of starch gelatinization of the dough from which the taco shell is baked being from about 40% to about 60%, the total amount of said coarse corn component and said fine starchy component being at least about 65% by weight, said weight percentages being based upon the weight of the taco shell, said taco shell having a taco-shell-like appearance and a crispy texture wherein visible, hard, white spots in the taco shell are not present.

11. A baked taco shell as claimed in claim 10 wherein said limed coarse ground corn component has a particle size distribution of greater than about 75% by weight retained on a 40 U.S. mesh screen, and said fine ground starchy component has a particle size distribution of at least about 25% by weight passing through a 40 U.S. mesh screen.

12. A baked taco shell as claimed in claim 11 wherein the degree of starch gelatinization of the baked taco shell is greater than about 90%.

* * * * *